June 2, 1959  D. R. PEDRICK  2,888,751
GAUGE ATTACHMENT
Filed March 5, 1956
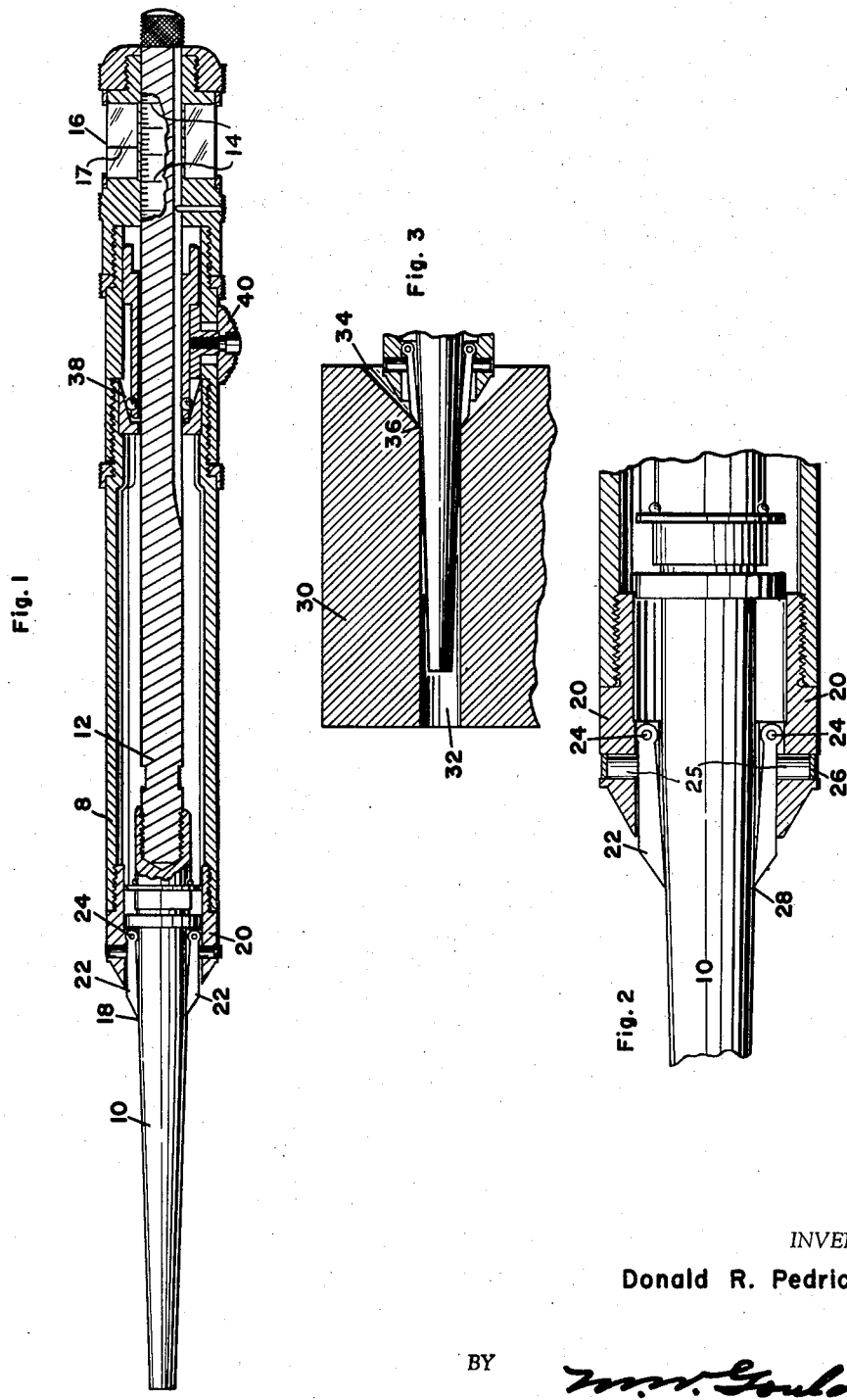
INVENTOR
Donald R. Pedrick
BY *M. V. Gould*
ATTORNEY

# United States Patent Office 2,888,751
Patented June 2, 1959

2,888,751
GAUGE ATTACHMENT

Donald R. Pedrick, Shoemakersville, Pa., assignor to Hamilton Watch Company, Lancaster, Pa., a corporation of Pennsylvania Application March 5, 1956, Serial No. 569,540

5 Claims. (Cl. 33—178)

This invention relates to an attachment for gauges of the type having a tapered rod adapted to measure hole sizes and slots.

It is old and well known in the art to use a tapered rod or pin, inserted in a hole and determine the diameter of the hole by looking at markings on the tapered pin or by calculating this diameter by the distance the tapered pin goes into the hole. The attachment is directed to that type of tapered gauge which carries an elongated spindle movable with the tapered rod and carrying indicia markings which pass before a zero marking and are graded to give the diameter of the hole in relation to the longitudinal movement of the tapered rod and spindle.

It was found that when the end of the gauge was used as a stop for the longitudinal movement of the tapered rod there were occasions when the reading was inaccurate, either due to a slight burr on the end of the hole or by having the hole countersunk or by coming in contact with uneven surfaces of the metal on which the hole was bored.

It is the purpose of this invention to provide a pair of pivoted fingers having knife edges which engage the outside diameter of the tapered rod and accurately serve as a stop in the longitudinal movement of the tapered rod.

It is a further object of the present invention to provide a pair of fingers located on each side of a tapered rod having knife edges engaging the outside diameter of the rod and to provide means for holding the fingers in constant engagement with the tapered sides of the rod.

The invention is illustrated in the accompanying drawing in which:

Figure 1 is a longitudinal section of the type of gauge to which the invention is attached.

Figure 2 is a partial longitudinal section enlarged to show the construction of the spring fingers.

Figure 3 is a detail view showing the spring fingers in operating position.

Referring particularly to Figure 1, a gauge is shown which is of the type shown in Patent Number 2,786,277. This gauge shows a casing 8 in which is mounted a tapered rod 10 having an attached spindle 12 carrying indicia 14. A window 16 in the casing permits the indicia carried on the spindle 12 to be read against a zero position 17 scribed on the surface of window 16 so that the longitudinal movement of the tapered rod is expressed in figures indicating the diameter of the hole at a point 18, the termination of the pivoted fingers.

A nose piece 20 is threaded into the casing 8 and carries a pair of fingers 22 pivotally mounted at 24 and urged in a direction toward the tapered rod 10 by a spring band 26. A pair of cylinders 25 transmit the force of the spring band 26 to the fingers 22. The forward edges of the fingers 22 terminate in a knife edge 28.

Referring particularly to Figure 3, a piece of metal 30 having a hole 32 which is countersunk at 34 is shown with the tapered end of the rod inserted into the hole. The rod can be inserted into the hole until the diameter of the rod is equal to the diameter of the hole so that it engages the sides at the point 36. Further movement of the casing 8 brings the ends 28 of the fingers into engagement with the edge of the hole at the point 36. At this point the reading is taken on the spindle through the window 16 and the diameter of the hole ascertained. A locking mechanism shown at 38 holds the rod in position until the reading is taken and a release button 40 is manually operated so that the tapered rod may return to its extruded position.

What is claimed is:

1. In a gauge having a longitudinal moving tapered measuring rod, a casing for receiving said rod, a spindle attached to and extending in line with said rod and marked with measuring indicia, a zero marking carried on said case against which said indicia is read, and a pair of fingers pivoted to said case and extending along the sides of the tapered rod, means urging said fingers into engagement with said rod, said fingers engaging the edge of the hole to be gauged at the point of measurement.

2. A gauge according to claim 1 in which the fingers have tapered ends and a minimum cross-sectional area at the point of contact with the edge of the hole.

3. A gauge having a longitudinal moving tapered measuring rod, a spindle carrying measuring indicia attached to and forming a prolongation of said rod, a casing for receiving said spindle and said rod and formed with a zero marking against which said indicia is read, and a pair of fingers pivoted to said case adjacent the end and extending beyond said case and along the sides of the tapered rod, and means for forcing the ends of said fingers into contact with the sides of said rod at all times, whereby when measuring the diameter of a hole the ends of the tapered fingers coincide with the point of measurement.

4. In a gauge having a longitudinal moving tapered measuring rod, a casing for receiving said rod, a spindle attached to and extending in line with said rod and marked with measuring indicia, a zero marking carried on said case against which said indicia is read, a pair of fingers pivoted to said case on axes perpendicular to the axis of said rod and extending beyond said casing, and spring means urging said fingers into engagement with said rod at all times.

5. A gauge as set out in claim 4 wherein said fingers are tapered and diminish in size as they extend away from said casing, said spring means comprising a spring band encircling said fingers.

References Cited in the file of this patent

FOREIGN PATENTS 992,336    France _____ July 11, 1951